United States Patent [19]
Gonzalez

[11] Patent Number: 6,087,587
[45] Date of Patent: Jul. 11, 2000

[54] ELECTRICAL OUTLET BOX WITH EXTENDABLE CONNECTOR

[76] Inventor: Sean Gonzalez, 1246 Tuxford Dr., Brandon, Fla. 33511

[21] Appl. No.: 09/074,600

[22] Filed: May 8, 1998

[51] Int. Cl.[7] .................................................. H01H 9/02
[52] U.S. Cl. ........................... 174/57; 174/135; 242/397; 439/501; 220/3.7
[58] Field of Search ................................. 174/53, 55, 57, 174/135; 242/389, 397, 398; 439/501; 220/3.3, 3.7

[56] References Cited

U.S. PATENT DOCUMENTS

| | | | |
|---|---|---|---|
| 2,007,699 | 7/1935 | Wiebking | 174/135 X |
| 2,521,226 | 9/1950 | Keller | 174/135 X |
| 2,820,112 | 1/1958 | Lupu | 191/12.2 |
| 2,856,470 | 10/1958 | Hyde | 439/501 |
| 3,054,382 | 9/1962 | Ebel | 242/908 X |
| 3,056,863 | 10/1962 | Johnson | 439/4 X |
| 3,566,332 | 2/1971 | Bonhomme | 339/28 |
| 3,733,478 | 5/1973 | Barker | 174/50 X |
| 3,815,078 | 6/1974 | Fedrick | 339/28 R |
| 3,920,308 | 11/1975 | Murray | 339/119 C |
| 4,057,453 | 11/1977 | Bataev et al. | 156/390 |
| 4,232,837 | 11/1980 | Cutler et al. | 242/107 |
| 4,467,979 | 8/1984 | Koehler | 242/96 |
| 5,034,571 | 7/1991 | Galloway | 191/12.2 A |
| 5,236,371 | 8/1993 | Matthis | 439/501 |
| 5,494,446 | 2/1996 | DeLucia et al. | 439/4 |
| 5,679,925 | 10/1997 | Dilley | 174/53 |
| 5,723,815 | 3/1998 | Pena | 174/53 |

*Primary Examiner*—Dean A. Reichard
*Attorney, Agent, or Firm*—Jacobson, Price, Holman & Stern, PLLC

[57] ABSTRACT

There is a disclosure of a system for a wall mounted electrical duplex outlet receptacle that can be removed from the wall and includes a length of electrical extension cord integrally attached to provide electrical power to distant locations. When the duplex assembly is installed and latched to an interior box in the wall, the redundant length of the extension cord can be removed out of the interior box and wound about a spring loaded roller reel located remotely away from the box and duplex through the interior of the wall providing for the availability of a substantial length of extension cord when the duplex is to be removed. When installed in the wall, the duplex appears similar to a standard electrical duplex with a standard face plate. In addition, the invention includes structure for latching the duplex to the wall in the interior box as well as for an improved electrical connection between the roller reel and the outside electricity source that eliminates twisting of the wire as the reel rotates.

20 Claims, 4 Drawing Sheets

ELECTRICAL OUTLET BOX WITH EXTENDABLE CONNECTOR

BACKGROUND OF THE INVENTION

1. Field of the Invention

The present invention relates to a standard conventional wall mounted electrical outlet receptacle box assembly, primarily for residential applications, that includes an extendable connection to the electrical power source inside the residence. Such an outlet box assembly retains the aesthetic appearance and qualities of a standard conventional box when the removable assembly is positioned in the wall and also permits the removal of a duplex assembly to provide an electrical receptacle duplex outlet at distant locations from the wall otherwise unobtainable without the use of an accessory extension cord.

2. Description of Related Art

There can be a need for an electrical power source and receptacle for an electric appliance, tool or such, at a remote location too distant from a standard wall-mounted electrical outlet for using the power plug cord of the appliance alone. Typically in such a situation, whether it be a domestic household, office, or industrial application, a standard electrical extension cord is used to connect the outlet box to the appliance plug. Extension cords, however, are cumbersome and their lengths are usually not self-adjusting. Also, extension cords can lead to problems with an accidental removal of either the appliance plug or the intermediate extension cord plug which will interfere with the use of the appliance. Moreover, the additional connection of the extension cord plug at the wall mounted outlet is not a sealed connection.

Attempts in the prior art have sought to provide an improvement over simple extension cords by allowing an electrical receptacle to be removed and extended from a standard wall mounted outlet box. For example, U.S. Pat. No. 3,920,308, issued Nov. 18, 1975 to H. Murray, discloses a wall mounted outlet box containing dual receptacles. Each receptacle is connected to a cord and each cord is wound upon separate spools contained within the outlet box. When a spool is slid out from the interior of the box, the cord can be unwound to provide an extended receptacle. The cord in this outlet box has a length, however, that is limited by the space within the box as well as the diameter or gauge of the cord selected. The extended cord must also be manually wound back onto the spool for reinstalling the receptacle. Additionally, this outlet box structure does not permit the advantageous removal and extension of an entire sealed receptacle duplex assembly having two individual socket receptacles for use at remote locations from the wall mount.

U.S. Pat. No. 3,566,332, issued on Feb. 23, 1971 to J. Bonhomme, discloses a reel unit for an extension cord which can be located within a conventional wall mounted box and allows for a return spring to automatically retract the cord back on to the spring loaded spool. One problem with the return structure is that the cord will become twisted at the end nearest the power source as the spool rotates to release and extend the cord. Again, each receptacle may be extended only a limited distance due to the dimensional restrictions of the interior of the standard outlet box, and the entire receptacle duplex is not itself removable as a single unit.

SUMMARY OF THE INVENTION

The present invention contemplates improvements for a wall mounted outlet box apparatus capable of extending a sealed removable receptacle duplex assembly to remote distances from the wall mount. The invention provides a spring-loaded roller reel assembly that may be secured to a remote location away from the internal wall mounted box, such as a head joist in an attic or some other convenient location with sufficient space and clearance to hold the reel assembly. The power cord is then routed to the wall outlet box by suitable pulleys and guides to supply power to the removable duplex assembly. When the removable duplex assembly is released from the outlet box, it can be removed and carried to a desired location for supplying electrical power to one or more plugs for appliances or such as the extension cord is unwound from the remotely located roller reel assembly. When it is desirable to reinstall the duplex assembly, the spring loaded roller reel assembly retracts the power cord through the wall and winds the cord on the reel for storage.

The remote location of the roller reel assembly allows for a longer length of an extension and a safer gauge of cord, such as 12 gauge, than would otherwise be available. The return spring in the assembly may be of a conventional type, such as those that lock when tension is released when pulling the cord, which prevents retraction, and unlocks when tension is reestablished, which retracts the cord under the power of the spring. Alternatively, the spring loaded roller reel assembly may include a locking structure controlled by the user by an activation switch on the removable duplex assembly to prevent or allow retraction of the cord.

When installed and latched in the outlet box in the wall, the removable duplex assembly has an appearance and may be used like a standard conventional wall mounted receptacle box. The duplex assembly is latched into the internal wall mounted box by a suitable latching assembly such as a spring biased catch that may be released by external means such as the face screw which would normally secure a conventional face plate to the outlet box. The screw is turned to extend or withdraw spring biased rods into accommodating holes in the sides of the internal wall box. This structure for the removable duplex assembly is aesthetically appealing and provides child tampering protection.

The power cord from the roller reel assembly is routed to the internal wall mounted box with pulleys and sleeve guide assemblies. Depending upon the location of the assembly, it may be required to route the cord through a head joist, cross members, or the like, which may cause undesirable rubbing or chafing of the cord as it is pulled back and forth. The present invention provides a sleeve guide assembly that comprises funnel-shaped cones connected to the ends of a hollow tube, both of which are made of cardboard, plastic, or the like to provide smooth, non-chafing surfaces against which the cord may slide for protection. In addition, when interference of the power cord with other items in the routing path of the cord is a concern, the cord may be routed through a series of hollow tubes that extend the entire distance between the roller reel assembly and the outlet box. Inside the internal wall mounted box are roller cord guides that direct the cord in non-binding directions for proper extension and retraction of the cord.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
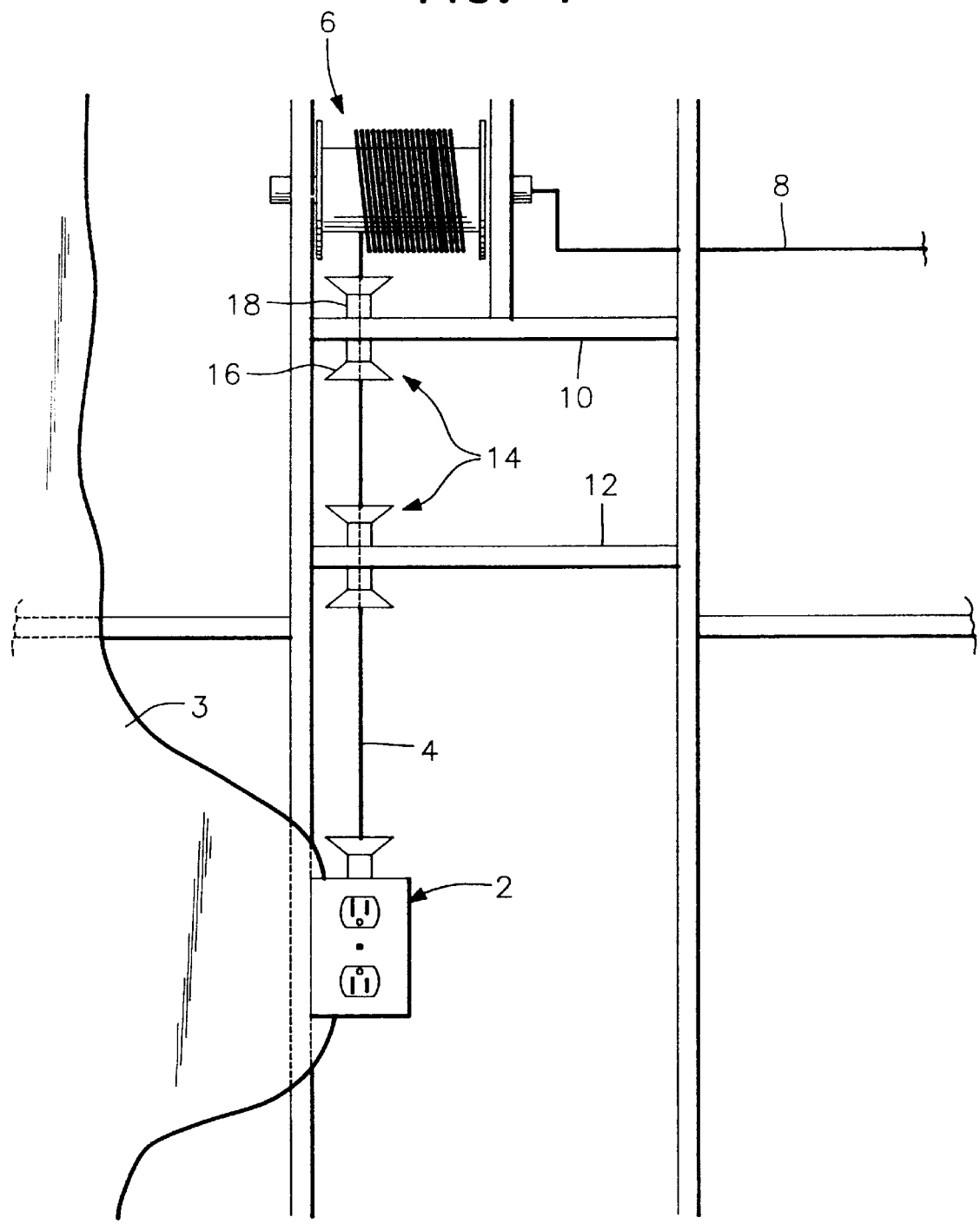
FIG. 1 is a front view of the present invention as installed in a wall.

Although only one preferred embodiment of the invention is shown in the drawings and explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Referring to FIG. 1 of the drawings, there is shown the present invention installed in a conventional manner with fasteners in the cavity of either an interior or exterior wall. The removable duplex assembly, generally designated by the numeral 2, is shown installed in the wall and appears as shown as a conventional wall mounted duplex outlet receptacle. The sliding power cord 4 delivers electrical power to the removable duplex assembly 2 from the spring-loaded roller reel assembly generally designated by the numeral 6. The reel assembly 6 is suitably connected to an available outside electric power source line 8. The roller reel assembly 6 should be of sufficient size to store a substantial length of heavily insulated cord 4. In a preferred form, the roller reel assembly should store at least 100 feet of standard 12 gauge electrical wire.

The power cord 4 is routed through the head joist 10 and cross-member 12 through sleeve guide assemblies generally designated by the numeral 14 which preferably comprise funnel shaped cones 16 securely attached to the ends of hollow tubes 18 by threading, pressure fitting, or the like. The cones 16 and 18 are preferably made of cardboard, plastic, or some other convenient, inexpensive and durable material that will prevent chafing and abrasion of the cord 4 as it passes therethrough. As an alternative to that shown in FIG. 1, the hollow tube 18 may extend the entire distance between the roller reel assembly 6 and the installed location of the removable duplex assembly 2 to prevent interference with other items in the interior of the wall, such as insulation, installed wiring or the like.

Figure 2:
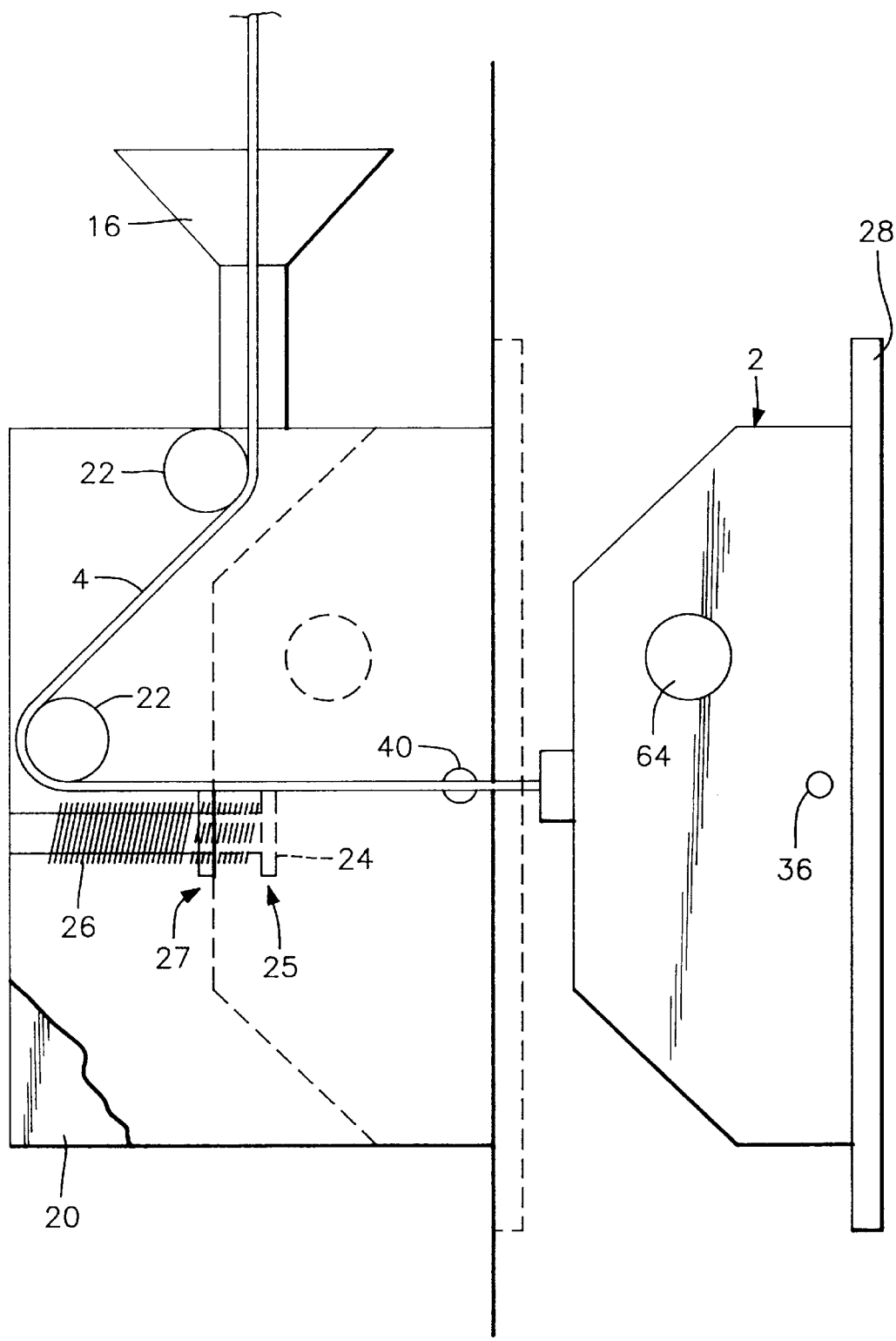
FIG. 2 is a side view of an internal wall box in accordance with the present invention showing the internal parts and the removable duplex assembly.

FIG. 2 shows the side view of the removable duplex assembly 2 removed from an internal wall mounted box 20 as shown in solid lines. The internal wall box should preferably resemble the dimensions of a standard size electrical box, that is approximately 5" in height by 2.5" in width by 3" in depth. The dotted lines show the position of the removable duplex assembly 2 when secured inside the internal wall box 20. The removable duplex assembly preferably has a single unit construction, such as by plastic mold or the like, with a sealed connection to the power cord 4. This construction is advantageous particularly where the duplex assembly is installed in an exterior wall subject to weather conditions. An appropriate outlet cover, not shown, as typically used in an outdoor receptacle can keep the removable duplex assembly completely sealed from the weather and water. Roller cord guides 22 are preferably installed inside internal wall box 20 to direct the power cord 4 within the box 20 and provide a convenient route for the cord 4 for its extension and retraction. The internal box 20 also includes a spring contact plate 24 which is spring biased forward as at 25 by appropriate means, such as by box spring 26, from the rear of the box 20 to contact and urge the duplex 2 out of the box 20 and facilitate its removal when unlatched.

Figure 3:
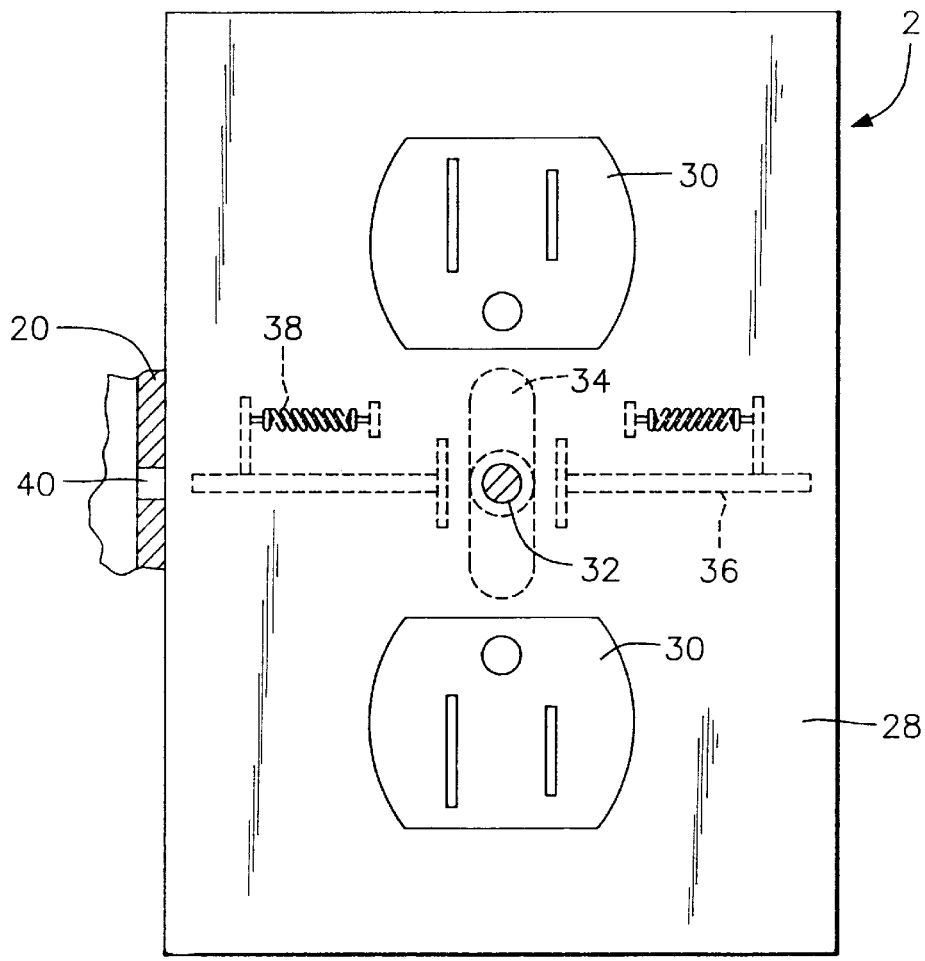
FIG. 3 is a front view of the removable duplex assembly of the present invention shown in an unlatched position.
Figure 4:
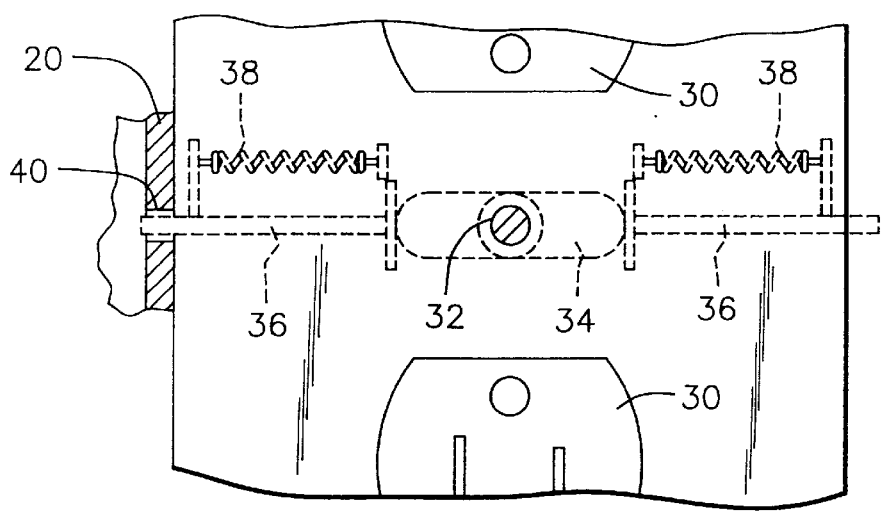
FIG. 4 is a also a front view of the removable duplex assembly of FIG. 3 shown latched to the internal wall box.

The duplex assembly 2 is latched to the internal wall mounted box 20 by appropriate means, such as by a structure as shown in FIGS. 3 and 4. The duplex assembly 2 includes an external receptacle facer plate 28 revealing access to the standard conventional receptacles 30. Facer plate 28 gives the duplex assembly 2, when installed, an appearance of a conventional wall mounted receptacle duplex and includes a slotted screw head which acts as a key 32 for latching the duplex. Key 32 is connected to rotating lobe apparatus 34 located behind the facer plate 28 which engages as a cam with a pair of push rod assemblies 36, one on each side of the assembly 2. In the position shown in FIG. 3, the push rod assemblies 36 are in the unlatched position, biased by retractor tension spring 38. When the duplex assembly 2 is to be latched into the box 20, the duplex assembly 2 pushes the spring contact plate 24 towards the rear of the box 20 until the facer plate 28 is flush against the exterior wall surface 3. With duplex assembly 2 in this position, key 32 is rotated 90 degrees so that the lobe apparatus 34 contacts the push rods 36 directing each transversely across the interior side of the facer plate 28 into engagement holes 40 on the sides of internal box 20 to latch the duplex assembly 2 inside the internal wall box 20. Key 32 can have a simple slotted head as shown in the FIGS. 3 and 4 for effecting rotation with a screw driver. Preferably, key 32 is keyed to accept only a special and specific tool to make the assembly child tamper proof.

Figure 5:
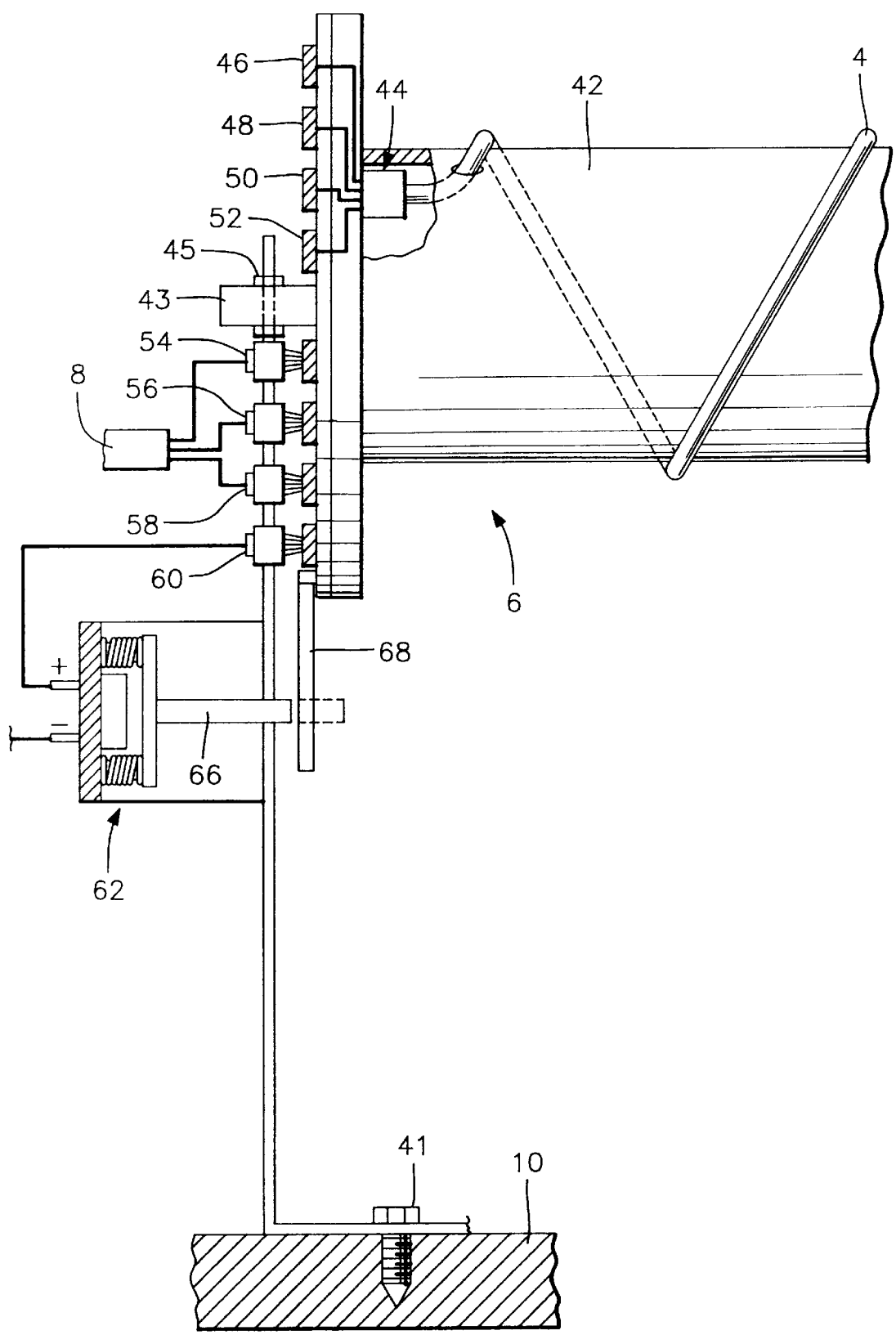
FIG. 5 is a back view of the spring loaded roller reel assembly of FIG. 1 showing the power brush assembly and the solenoid assembly.

FIG. 5 shows the remotely located spring loaded roller reel assembly 6 attached to a head joist 10 or such by screw 41 or other suitable attachment and the structure for delivering outside electrical power through power line 8 to the assembly such that the power line 8 will not twist when the reel 42 rotates. Reel 42 rotates about reel shaft 43, and shaft 43 rotates within bearings 45. The spring loaded roller reel assembly 6 is spring loaded by conventional methods known in the art to bias the reel to retract and wind the cord 4 about the reel 42. Alternatively, the roller reel assembly 6 could be motorized or the like to avoid the need of the spring loading all together. In this alternative form of the invention, the reel 42 could be attached to an electric motor to have the cord retracted.

The end of power cord 4 opposite the removable duplex assembly 2 is connected to one end of reel 42 as shown at 44. This end of reel 42 includes concentric commutator rings 48, 50 and 52, made of copper or the like, that work in conjunction with power brush apparatus 54, 56 and 58 to transfer electricity from the outside power line 8 to the sliding power cord 4. As the reel 42 rotates each commutator ring stays in contact with a power brush assembly. Each commutator ring is connected to the positive, negative or grounding electrical connections in the electrical circuit and the choice of any particular ring amongst them is not considered important. The significant aspect to this part of the present invention is that the commutator rings and brush assembly apparat permit delivery of electrical connection between outside power source line 8 to slide cord 4 without twisting of the cords.

In a preferred embodiment of the present invention, a fourth and final of these commutator rings 46 and power brush apparatus 60 can be used to activate the solenoid apparatus generally indicated by the numeral 62. Solenoid apparatus 62 is used to latch or catch reel 42 and prevent its rotation and, thereby, retraction of the sliding cord 4. The removable duplex assembly 2, as shown in FIG. 2, includes a solenoid activation switch 64 that, when activated, withdraws a solenoid pushrod 66 of solenoid apparatus 62. This withdrawal permits the unwinding and rotation of reel 42 since pushrod 66 becomes removed from the path of solenoid catch bar 68. The exact operational construction of solenoid apparatus 62 is well known in the art, and its operational structure, therefore, need not be described in conjunction with the present invention. However, the use of the commutator ring 46 and the power brush apparatus 60 permits electrical communication between the removable duplex assembly 2 and the solenoid apparatus 62. In addition, for safety purposes the present invention preferably includes a conventional ground-fault interrupt circuit (not shown) to prevent accidents caused by damage to the integrity of the system.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. An extendable electrical outlet receptacle for a wall mounted outlet box, comprising a removable outlet receptacle assembly, a spring loaded roller reel assembly for holding, winding and dispensing a sliding power cord for extending said removable assembly from said outlet box, said roller reel assembly being located remote from and outside of said outlet box, and said sliding power cord making electrical connection between said removable receptacle assembly and an external outside electrical power source.

2. An extendable outlet receptacle as described in claim 1, wherein said removable outlet receptacle assembly includes a removable outlet receptacle duplex assembly having two socket receptacles and a facer plate adapted to form an appearance of a non-extendable wall mounted outlet duplex assembly when said removable receptacle assembly is installed in the wall.

3. An extendable outlet receptacle as described in claim 1, wherein said removable receptacle assembly is seal connected to said sliding power cord.

4. An extendable outlet receptacle as described in claim 3, wherein said outlet receptacle is located in an external wall subjected to outside weather conditions and said facer plate appears as a non-extendable external wall receptacle duplex.

5. An extendable outlet receptacle as described in claim 1, wherein said spring loaded roller reel assembly includes means for connecting said sliding cord to the outside power source without twisting of a cord from the power source upon rotation of a reel of said roller reel assembly.

6. An extendable outlet receptacle as described in claim 5, wherein said means for connection includes contact between concentric rings and power brush assemblies.

7. An extendable outlet receptacle as described in claim 1, wherein said roller reel assembly includes a reel and a latch and said latch is activated for release of said reel by an activation switch accessible to a user of said outlet receptacle.

8. An extendable outlet receptacle as described in claim 7, wherein said activation switch is located on said removable receptacle assembly.

9. An extendable outlet receptacle as described in claim 1, and further comprising sleeve guide assemblies for guiding said sliding power cord between said remotely located roller reel assembly and an internal wall mounted box that secures said removable receptacle assembly in an installed position in the wall, said sleeve guide assemblies preventing chaffing and deterioration of said sliding cord during extraction and retraction.

10. The extendable outlet receptacle as described in claim 1, wherein said removable receptacle assembly is installed into an internal wall mounted box in the wall with dimensions of a non-extendable electrical outlet box and said removable receptacle assembly appears as a non-extendable outlet duplex when installed in the wall.

11. The extendable outlet receptacle as described in claim 10, wherein said removable receptacle assembly is latched to said internal wall mounted box by a latching assembly activated by a key on a facer plate of said removable receptacle assembly.

12. A removable and extendable wall mounted electrical outlet receptacle duplex with a remotely located storage of extension cord comprising a removable receptacle duplex assembly, a roller reel assembly adapted to store a sliding power cord, said sliding power cord electrically connecting said removable duplex assembly to said roller reel assembly, an electrical connection between said roller reel assembly and an outside electrical power source to provide power to said sliding power cord, an internal wall mounted box for mounting said removable duplex into the wall, and said roller reel assembly being located remote from and outside of said wall mounted box and including means for retracting said sliding power cord on to a reel of said roller reel assembly.

13. A removable receptacle duplex as described in claim 12, wherein said removable duplex assembly appears and functions substantially like a non-removable wall mounted outlet receptacle duplex when mounted into said internal wall mounted box.

14. A removable receptacle duplex as described in claim 13, wherein said roller reel assembly is secured to a structural member of a building that contains the wall in which said internal wall mounted box is located.

15. A removable receptacle duplex as described in claim 13, and further comprising a sleeve guide system to route said sliding power cord between said roller reel assembly and said internal wall mounted box to prevent chaffing and deterioration of said sliding cord.

16. A removable receptacle duplex as described in claim 12, wherein said reel of said roller reel assembly winds and stores at least a portion of said sliding cord, said cord being heavily insulated and containing wire of a minimum 12 gauge thickness and said reel storing at least 100 feet of said sliding cord.

17. A removable receptacle duplex as described in claim 12, wherein said roller reel assembly is connected to the outside power source by concentric commutator circles and power brush assemblies to allow said reel to rotate without twisting a cord to the outside power source as said roller reel assembly windingly dispenses or retracts said sliding power cord.

18. A removable receptacle duplex as described in claim 12, wherein said duplex assembly is latched into said internal wall mounted box with a key rendering removal of said removable receptacle duplex assembly tamper proof, and said internal wall mounted box includes a spring plate at its rear side to urge the removable duplex outward for assistance in its removal when unlatched.

19. A removable and extendable wall mounted outlet box receptacle duplex system that permits removal of a receptacle duplex assembly for relocation and use at distances remote from an installed position in a wall comprising a roller reel assembly including a reel and connections to an outside source of electricity, said roller reel assembly being located at a remote site outside of and distant from an internal wall mounted box used to hold the duplex assembly in the wall, said roller reel assembly being capable of windingly storing and dispensing a length of electrical cord on said reel, one end of said electrical cord having an electrical connection with the receptacle duplex assembly and a second end connected with said roller reel assembly.

20. A removable receptacle duplex system as described in claim 19, wherein said internal wall mounted box has the dimensions of a non-extendable wall mounted electric box and the removable receptacle duplex assembly includes a non-extendable appearing outlet receptacle duplex face plate affording the removable duplex assembly an appearance substantially similar to a non-removable wall mounted receptacle duplex when installed in said internal wall mounted box.

* * * * *